United States Patent Office 3,297,615
Patented Jan. 10, 1967

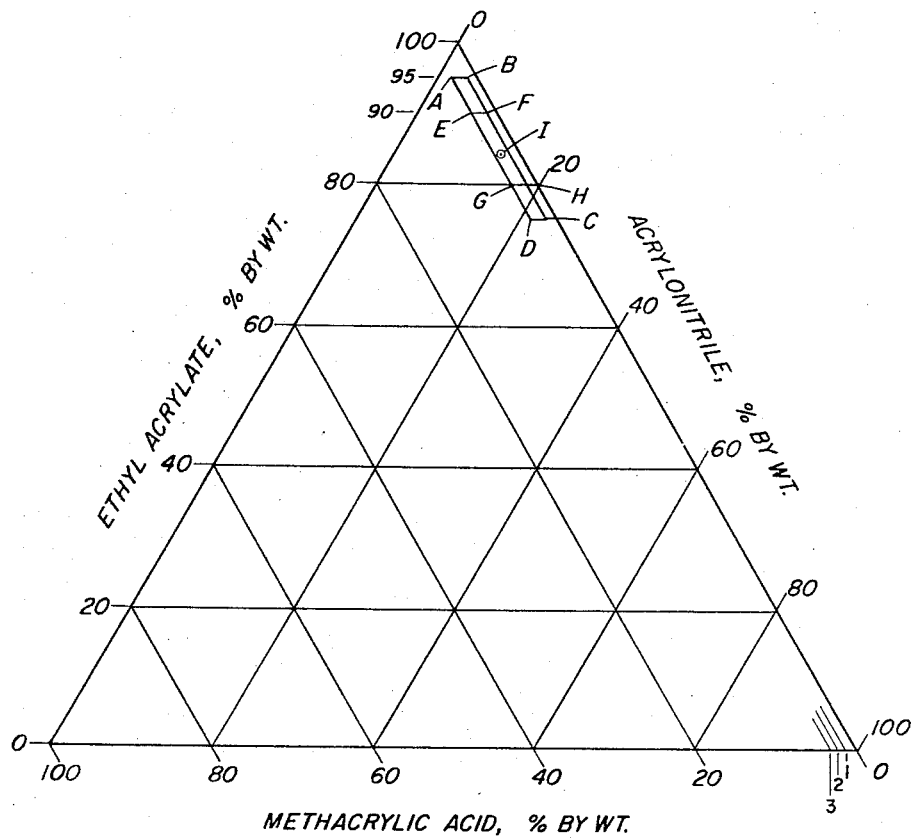

3,297,615
PIGMENT BINDER OF ACRYLATE-ACRYLONI-TRILE-METHACRYLIC ACID FOR PAPER COATINGS
Charles Frazier, Old Greenwich, Conn., and Daniel Dickerson Ritson, Yonkers, N.Y., assignors to American Cyanamid Company, Stamford, Conn., a corporation of Maine
Filed Oct. 1, 1963, Ser. No. 313,067
7 Claims. (Cl. 260—29.6)

The present invention relates to coating compositions for the preparation of pigment-coated paper, consisting essentially of a hydrophilic paper coating pigment and a water-insoluble vinyl polymer as adhesive therefor. The invention includes paper carrying such a coating on at least one side.

Aqueous pigment coating compositions for paper are widely known and preferably consist essentially of a high-solids aqueous suspension or "slip" of a hydrophilic paper coating pigment (clay, barytes, calcium carbonate, titanium dioxide, or mixtures thereof) and an emulsified water-insoluble adhesive therefor. Typically, the weight of the adhesive is between 5% and 20% of the weight of the pigment i.e., the weight of the pigment is 5 to 20 times the weight of the polymer, and the amount of water present is sufficient to provide a coating suitable viscosity.

The discovery has now been made that pigment coating compositions wherein the adhesive is an 75–95:4–24:1–3 percent by weight ethyl acrylate:acrylonitrile:methacrylic acid copolymer provide paper with pigmented coatings of superior resistance to removal by the pulling action of ink during high-speed printing. This resistance is hereinafter referred to as "pick resistance." The copolymer exhibits superior adhesiveness to the pigment and to the cellulose fibers of which paper is composed, which accounts for the superior pick resistance of the coating composition when present in dry state on paper.

The further discovery has been made that the pick resistance of the coating is increased when the copolymer is prepared by emulsion copolymerization of the monomers in an aqueous medium wherein sodium dialkyl sulfosuccinate, containing two esterified alkyl groups each of which contains between about 5 and 8 carbon atoms is present as the emulsifying agent. Such emulsifying agent is hereinafter termed a sodium $C_5$–$C_8$ dialkyl sulfosuccinate.

The copolymer adhesive which is present in compositions of the present invention is substantially composed of ethyl acrylate, acrylonitrile and methacrylic acid in respective weight ratios within the range of 75%–95%, 4%–24%, and 1%–3%, the relative amounts of each of these constituents in each instance being chosen so as to be represented by any point within parallelogram ABCD of the appended drawing, which represents a three-phase diagram defining the composition of the copolymer in terms of the percentages by weight of its constituents. The copolymer is present in the composition as a latex.

Our laboratory work has shown that polymers of best adhesiveness have the composition indicated by rectangle EFGH of the drawing, shown in solid lines. Polymers having the composition indicated by rectangles ABEF and CDGH (shown partially by dotted lines) possess very satisfactory adhesiveness but in general do not impart as high pick values as polymers of composition which falls within the rectangle EFGH, which are therefore preferred.

A series of laboratory tests has shown that compositions wherein the vinyl adhesive is composed of the three named components in the weight ratio of 84:14:2 possess particularly good adhesiveness. The polymer of this composition is represented by point I in the drawing.

In general, the presence of less than about 75% by weight of ethyl acrylate in the copolymer causes a decrease in the adhesiveness of the copolymer, so that pigment coating compositions containing the polymer as principal adhesive possess inferior pick values when applied to paper. The same result occurs when too much (more than about 95% by weight) of the ethyl acrylate is present.

The presence of more than about 3% by weight of methacrylic acid results in a polymer latex having an excessively high viscosity and inferior adhesiveness, and less than about 1% of this component causes the latex to decrease in adhesiveness as well.

The acrylonitrile is present in amount sufficient to make up 100% of the polymer.

The reason why coating compositions containing copolymer prepared by the use of the preferred emulsifying agents should give superior results is not known, and the applicants do not wish to be bound by any theory.

The composition of the present invention are conveniently prepared by a latex of the composition described herein with a paper coating pigment slip to provide a coating composition for paper such as is described above.

The invention does not depend upon the particular manner in which the polymer latex and pigment slip are prepared, and any convenient method may be employed.

In general, it will be found convenient to prepare the latex by forming a mixture of the three principal components of the polymer (the ethyl acrylate, the acrylonitrile, and the methacrylic acid in desired ratio and to emulsify these components at elevated temperatures in aqueous medium containing suitable vinyl polymerization catalyst and an emulsifying agent. Details are shown in Ritson U.S. Patent No. 2,889,299, which also shows a method for incorporation of pigment into a latex of a vinyl copolymer.

It is a feature of the invention that coatings which exhibit best pick resistance when applied to paper are obtained when the copolymer adhesive is prepared by emulsion polymerization in the presence of a $C_5$–$C_8$ dialkyl sulfosuccinate. The agents of this type are water-soluble, at least to a slight extent, and include sodium di-(methylamyl) sulfosuccinate, dioctyl sulfosuccinate, and the sulfosuccinates shown in the examples below. The alkyl groups in each sulfosuccinate may be the same or mixed.

These sulfosuccinates are used in customary amount, and no larger amount need be employed than that which is required to form a stable latex. Best results in terms of adhesiveness and wet rub resistance of the coating are obtained when the sulfosuccinates are used as the sole emulsifying agents in minimum effective amount.

The resulting latices may be used as thus prepared. However, they exhibit superior adhesiveness when ammoniated, so as to convert the copolymer into ammonium salt form. This can be done by adding sufficient ammonia to adjust the pH of these latices to at least 9.

The coating composition may contain materials which have been used in the past as components of pigmented paper coating compositions. Thus the compositions of the present invention may contain a minor amount of converted starch, casein, soya protein or polyvinyl alcohol as supplementary as adhesive, a polysiloxane antifoaming agent, and pentachlorophenol or a hydrophilic melamine-formaldehyde resin as preservative.

The pigment slip is prepared by slowly adding, with vigorous agitation, a hydrophilic inorganic mineral pigment into water which contains a dispersing agent for the pigment and alkali as may be required to adjust the pH of the pigment to that of the latex.

The coating compositions of the present invention may be applied to paper, paper board, etc. by roller-coater, air knife or other convenient means. The coating may be air-dried, or oven-dried at temperature up to about 250°–300° F. The resulting paper may be calendered. The resulting coatings are glossy and water-resistant.

The invention will be further illustrated by reference to the examples. These examples illustrate specific embodiments of the invention and are not intended as limitations thereon.

*Example 1*

The following illustrates the preparation and application to paper of a number of coating compositions according to the present invention, and the effect of various surface active agents in improving the adhesive action of the copolymer in the compositions.

An ammoniated anionic copolymer latex is prepared as follows.

(1) Aqueous phase: G.
   Deionized water _____ 97.8
   Emulsifier—Sodium di(1,3-dimethylbutyl) sulfosuccinate _____ 3.0
(2) Catalyst:
   Sodium bicarbonate _____ 0.75
                                            101.55
   Deionized water _____ 24.4
   Ammonium persulfate _____ 0.5
                                            24.9
(3) Monomers:
   Ethyl acrylate _____ 84.0
   Acrylonitrile _____ 14.0
   Methacrylic acid _____ 2.0   100.0

Total _____ 226.45

Mixture 1 is charged into a 3-necked flash fitted with two reservoirs, stirrer and reflux condenser. Mixture 1 is heated to 90° C. with rapid stirring and mixtures 2 and 3 are charged into the respective reservoirs. 10% of mixture 1 is added over ¾ minute, and the remainder of mixture 1 and 80% of mixture 2 are added dropwise over 2 hours. The remainder of mixture 2 is then added, and heating is continued for about an hour, until polymerization is complete. The resulting latex is cooled to room temperature and its pH is raised to 9.5 by addition of concentrated (29%) aqueous ammonia. It contains 44.3% copolymer solids by weight.

A pigment dispersion is prepared by rapidly agitating the following mixtures:

G.
Paper-coating clay (HT grade) _____ 503
Sodium tetraphosphate _____ 1
Sodium carbonate _____ 1
Water _____ 245

Total _____ 750 and the final coating composition is prepared by adding 169 g. of the above described latex thereto to the pigment dispersion with continued agitation.

The result is a coating color which contains 63% total solids by weight. The weight ratio clay:copolymer is substantially 7:1.

The composition is applied to standard 50 lb. (25" x 38"/500 ream) coating raw stock by means of a Bird laboratory applicator having an orifice of sufficient width to deposit a coating having a weight of 15 lb. per ream. The coated sheets are dried in air at room temperature, oven-dried for three minutes at 210° F. and are then calendered.

The procedure is repeated except that other similar copolymer latices are used as shown in the table below.

The adhesiveness of the polymer on the coated paper towards the paper and towards the pigment is determined by the standard I.G.T. (Instituut voor Grafische Techniek) test, wherein a strip of the coated paper under test is clamped to a roll and is rotated at an increasing rate of speed against a steel roller carrying a tacky black ink. The point of failure of the coating is the speed at which the tacky ink pulls specks of the coating from the paper (or pulls specks of pigment from the coating).

| Run No. | Monomer Ratio | Sodium Sulfosuccinate Emulsifier | Pick Resistance [1] |
|---|---|---|---|
| 1 | 80:19:1 | Di(1,3-dimethyl)butyl | 485 |
| 2 | 79:19:2 | ____do____ | 545 |
| 3 | 84:14:2 | ____do____ | 675 |
| 4 | 83:14:3 | ____do____ | 600 |
| 5 | 89: 9:2 | ____do____ | 595 |
| 6 | 90: 9:1 | ____do____ | 350 |
| 7 | 84:14:2 | Di(2-ethylhexyl) | 518 |
| 8 | 84:14:2 | Di(1-methylbutyl) | 465 |

[1] Feet per minute at which picking of the coating first occurs (with No. 4 ink, in I.G.T. test).

We claim:

1. A fluid aqueous ammoniated pigment coating composition for waterlaid cellulose webs, which consists essentially of a uniform suspension of a hydrophilic inorganic mineral pigment as coating component in a latex of a hydrophobic organic substantially 75–95:4–24:1–3 percent by weight ethyl acrylate:acrylonitrile:methacrylic acid copolymer as adhesive component therefor, and sufficient ammonium hydroxide to give said composition a pH of at least 9, the weight of said pigment being 5 to 20 times the weight of said polymer.

2. A composition according to claim 1 wherein the relative amounts of the constituents of said copolymer are chosen so as to be represented by parallelogram EFGH of the annexed drawing.

3. A composition according to claim 1 wherein the relative amounts of the constituents of said polymer are chosen so as to be represented by point I of the annexed drawing.

4. A fluid aqueous ammoniated pigment coating composition for water-laid cellulose webs, which consists essentially of a uniform suspension of a hydrophilic inorganic mineral pigment as coating component in a latex of a hydrophobic organic substantially 75–95:4–24:1–3 percent by weight ethyl acrylate:acrylonitrile:methacrylic acid copolymer as adhesive component therefor, said polymer being formed by copolymerization of said ethyl acrylate, acrylonitrile and methacrylic acid in aqueous medium containing a sodium $C_5$–$C_8$ dialkyl sulfosuccinate as emulsifying agent and sufficient ammonium hydroxide to give said composition a pH of at least 9, the weight of said pigment being 5 to 20 times the weight of said polymer.

5. A composition according to claim 4 wherein the sodium $C_5$–$C_8$ dialkyl sulfosuccinate is sodium di(1,3-dimethylbutyl) sulfosuccinate.

6. A composition according to claim 4 wherein the sodium $C_5$–$C_8$ dialkyl sulfosuccinate is sodium di(1-methylbutyl) sulfosuccinate.

7. Paper carrying on at least one side a coating composition in dried state according to claim 1.

References Cited by the Examiner

UNITED STATES PATENTS 2,889,299   6/1959   Ritson _____ 260—29.6
3,004,938  10/1961   Chambers et al. _____ 260—29.6

MURRAY TILLMAN, *Primary Examiner.*

J. ZEIGLER, *Assistant Examiner.*